United States Patent [19]
Abiko

[11] Patent Number: 5,976,659
[45] Date of Patent: Nov. 2, 1999

[54] OPTICAL DISK AND METHOD OF MANUFACTURING OPTICAL DISK

[75] Inventor: Toru Abiko, Miyagi, Japan

[73] Assignee: Sony Corporation, Tokyo, Japan

[21] Appl. No.: 09/088,291

[22] Filed: Jun. 1, 1998

Related U.S. Application Data

[63] Continuation of application No. 08/689,082, Jul. 30, 1996, Pat. No. 5,904,819.

[30] Foreign Application Priority Data

Jul. 31, 1995 [JP] Japan ................................ P07-194900

[51] Int. Cl.$^6$ ...................................................... B32B 3/00
[52] U.S. Cl. ...................... 428/64.1; 428/64.4; 428/64.5; 428/64.6; 428/913; 430/270.13; 430/945; 369/283; 369/288
[58] Field of Search ................................ 428/64.1, 64.4, 428/64.5, 64.6, 457, 913; 430/270.13, 495.1, 945; 369/283, 288

[56] References Cited

U.S. PATENT DOCUMENTS

| | | |
|---|---|---|
| 4,540,914 | 9/1985 | Maple . |
| 5,298,305 | 3/1994 | Shinozuka et al. . |
| 5,395,669 | 3/1995 | Kawahara et al. . |
| 5,549,963 | 8/1996 | Li . |
| 5,577,021 | 11/1996 | Nakatani et al. . |
| 5,718,961 | 2/1998 | Hong ....................................... 428/64.1 |
| 5,798,993 | 8/1998 | Ohkubo ....................................... 369/54 |
| 5,889,756 | 3/1999 | Ichihara ................................ 369/275.2 |

FOREIGN PATENT DOCUMENTS

| | | |
|---|---|---|
| 2-152050 | 6/1990 | Japan . |
| 3-105742 | 5/1991 | Japan . |
| 5-342655 | 12/1993 | Japan . |

*Primary Examiner*—Elizabeth Evans
*Attorney, Agent, or Firm*—Hill & Simpson

[57] ABSTRACT

An optical disk can provide a sufficiently wide power margin for a recording power even when the optical disk has a high-recording density. The optical disk has a transparent substrate on which a recording layer in which information can be rewritten by at least irradiation of laser beam, a dielectric layer and a thermal conduction control layer are sequentially deposited. The thermal conduction control layer comprises a first low thermal conductivity layer, a first high thermal conductivity layer, a second low thermal conductivity layer and a second high thermal conductivity layer sequentially deposited thereon.

4 Claims, 6 Drawing Sheets

OPTICAL DISK AND METHOD OF MANUFACTURING OPTICAL DISK

This application is a continuation of Ser. No. 08/689,082 filed Jul. 30, 1996 now U.S. Pat. No. 5,904,819 issued May 18, 1999.

BACKGROUND OF THE INVENTION

The present invention relates to an optical disk in which a recording layer and a dielectric layer are formed on a transparent substrate to rewrite information based on a rise in temperature generated by irradiation of laser beam and a method of manufacturing optical disk.

Recently, in the field of recording medium or the like used as an external memory of computers, as an amount of information processed by computers or the like increases, there is an increasing demand for increasing a recording capacity of a recording medium used as an external memory.

Further, there is an increasing demand that a recording medium can cope with an improvement of capability of central processing unit (CPU) of computer and a variety of applications.

Therefore, it is very effective to use an optical disk capable of very high-density recording and which is excellent in portability as a recording medium for an external memory of large storage capacity. In particular, the use of rewritable optical disks effectively utilizing a magnetooptical effect or a crystal—amorphous phase transition phenomenon is very promising.

Under the above-mentioned situations, a demand for making the optical disks become capable of high-density recording increases more and more. In order to improve a recording density, a wavelength of laser beam is shortened, and a so-called mark edge system is employed.

It is requested that optical disks used as external memory of computer are able to record information in a recording power of wide range so as to prevent recording/reproducing characteristics from being affected due to various factors such as a difference of disk drives, lens smudged by dusts or the like or a difference of environmental temperature.

However, in optical disks capable of high-density recording by laser beam with a short wavelength and the mark-edge recording system, a margin of recording power in which a satisfactory recording is possible is reduced due to deterioration of S/N (signal-to-noise ratio) and C/N (carrier-to-noise ratio) or thermal interference generated between adjacent codes. In particular, since the optical disk becomes capable of high-density recording, a recording mark length is fluctuated considerably due to an influence (thermal interference) of heat generated by mark immediately before the recording.

In order to solve these problems, it is necessary to control a flow of heat generated immediately before the recording. Specifically, a recording layer should have a temperature characteristic which is easily heated and cooled when the recording layer is irradiated with laser beam upon recording. The optical disk requires such temperature characteristic as a characteristic for suppressing thermal interference.

In order to solve the aforesaid problems, there are previously-proposed methods for controlling shape and size of a unit recording region (e.g., recording magnetic domain in a magnetooptical recording medium) by controlling flow of heat within the recording medium, e.g., the following methods (1) to (4):

(1) To control a thermal conductivity of a reflecting film (see Japanese laid-open patent publication No. 2-152050);

(2) To control a thermal conductivity of a protecting layer (UV protecting layer) (see Japanese laid-open patent publication NO. 4-337545 and Japanese laid-open patent publication No. 2-240846);

(3) To provide two reflecting films thereby to control a thermal conductivity of the reflecting films (see Japanese laid-open patent publication NO. 5-342655); and (4) To deposit a dielectric film on the reflecting film (see Japanese laid-open patent publication No. 3-105742).

However, the aforesaid previously-proposed methods (1) to (4) can improve any one of a characteristic in which a recording layer tends to be heated quickly, i.e., a temperature rise characteristic and a characteristic in which a recording layer tends to be cooled quickly, i.e., a temperature fall characteristic and cannot satisfy both of the temperature rise characteristic and the temperature fall characteristic.

SUMMARY OF THE INVENTION

In view of the aforesaid aspect, it is an object of the present invention to provide an optical disk which can provide a sufficiently wide power margin for a recording power even when the optical disk has a high-recording density.

According to an aspect of the present invention, there is provided an optical disk which comprises a transparent substrate on which a dielectric layer, a recording layer in which information can be rewritten by at least irradiation of laser beam, and a thermal conduction control layer are sequentially deposited, wherein the thermal conduction control layer comprises a first low thermal conductivity layer, a first high thermal conductivity layer, a second low thermal conductivity layer and a second high thermal conductivity layer sequentially deposited thereon.

According to another aspect of the present invention, there is provided a method of manufacturing an optical disk in which a dielectric layer, a recording layer in which information can be rewritten by at least irradiation of laser beam, and a thermal conduction control layer are sequentially laminated on a transparent substrate, the thermal conduction control layer comprising a first low thermal conductivity layer, a first high thermal conductivity layer, a second low thermal conductivity layer and a second high thermal conductivity layer sequentially deposited thereon. This method comprises the step of continuously discharging three layers of the first high thermal conductivity layer, the second low thermal conductivity layer and the second high thermal conductivity layer within the same sputtering chamber by use of the same target material while changing a flow rate of gas to thereby deposit the first high thermal conductivity layer, the second low thermal conductivity layer and the second high thermal conductivity layer by sputtering.

According to still another aspect of the present invention, there is provided a method of manufacturing an optical disk having a transparent substrate on which a dielectric layer, a recording layer in which information can be rewritten by at least irradiation of laser beam, and a thermal conduction control layer are sequentially deposited, the thermal conduction control layer comprising a first low thermal conductivity layer, a first high thermal conductivity layer, a second low thermal conductivity layer and a second high thermal conductivity layer sequentially deposited thereon. This method is characterized in that four layers of the first low thermal conductivity layer, the first high thermal conductivity layer, a second low thermal conductivity layer and the second high thermal conductivity layer are deposited within the same sputtering chamber by the same target material by means of continuous bombardment of ionized gas molecules while only a flow rate of gas is varied.

According to the present invention, since the optical disk includes the thermal conduction control layer and the thermal conduction control layer comprises the first low thermal conductivity layer, the first high thermal conductivity layer, the second low thermal conductivity layer and the second high thermal conductivity layer, the temperature characteristic of the recording layer can be recorded. Specifically, the first low thermal conductivity layer and the second low conductivity layer promote storage of heat in the recording layer thereby to enable a rapid rise in temperature to be realized, and the second high thermal conductivity layer promotes a diffusion of heat from the recording layer thereby to enable a rapid fall in temperature. Further, since the second low thermal conductivity layer is disposed between the first high thermal conductivity layer and the second high thermal conductivity layer, a temperature gradient in the film thickness direction can be controlled and the manner in which the temperature of the recording layer is changed with time can be controlled.

Furthermore, when this optical disk is produced, according to the manufacturing method of the present invention, since the three layers of the first high thermal conductivity layer, the second low thermal conductivity layer and the second high thermal conductivity layer are deposited within the same sputtering chamber by the same target material under continuous bombardment of ionized gas (sputtering) while only the flow rate of gas is changed, the optical disk with the multi-layer structure can be produced by the conventional production line for producing optical disks formed of four layers of a dielectric layer, a recording layer, a dielectric layer and a reflecting layer.

DETAILED DESCRIPTION OF THE PREFERRED EMBODIMENTS

An optical disk according to the present invention includes a transparent substrate on which a recording layer in which information can be rewritten by at least irradiation of laser beam, a dielectric layer and a thermal conduction control layer are deposited. The thermal conduction control layer comprises a first low thermal conductivity layer, a first high thermal conductivity layer, a second low thermal conductivity layer and a second high thermal conductivity layer laminated, in that order.

The transparent substrate is made of a material for passing laser beam therethrough, e.g., a transparent resin such as polycarbonate or glass.

Further, the optical disk has a protecting layer made of ultraviolet-curing resin formed on the opposite side of the transparent resin.

Inventive examples of optical disk and a method of producing optical disk according to the present invention will be described.

Inventive Example 1

Figure 1:
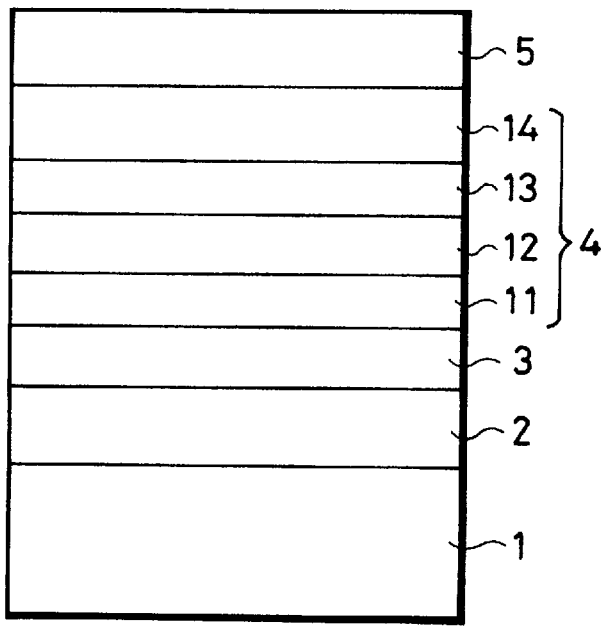
FIG. 1 is a schematic cross-sectional view showing an optical disk according to an embodiment of the present invention.

FIG. 1 is a schematic cross-sectional view illustrating an optical disk according to an embodiment of the present invention.

An optical disk, which is generally depicted by reference numeral 20 in FIG. 1, is a magnetooptical disk from which recorded information can be read out owing to a magnetooptical effect. The magnetooptical disk 20 has a transparent substrate 1 on which there are sequentially deposited a dielectric layer 2, a recording layer 3, a first low thermal conductivity layer 11, a first high thermal conductivity layer 12, a second low thermal conductivity layer 13, a second high thermal conductivity layer 14 and a protecting layer 5. A thermal conduction control layer 4 comprises four layers of the first low thermal conductivity layer 11, the first high thermal conductivity layer 12, the second low thermal conductivity layer 13 and the second high thermal conductivity layer 14.

This optical disk 20 is manufactured as follows.

The dielectric layer 2 formed of SiN film with a thickness of 100 nm is deposited on the transparent substrate 1 made of a polycarbonate resin by sputtering, and the recording layer formed of TbFeCo film with a thickness of 20 nm is deposited on the dielectric layer 2 by sputtering.

The first low thermal conductivity layer 11 formed of SiN film with a thickness of 30 nm is deposited on the recording layer 3 by sputtering, the first high thermal conductivity layer 12 formed of Al film with a thickness of 30 nm is deposited on the first low thermal conductivity layer 11 by sputtering, the second low thermal conductivity layer 13 formed of ZnS—SiO$_2$ film with a thickness of 30 nm is deposited on the first high thermal conductivity layer 12 by sputtering, and the second high thermal conductivity layer 14 formed of Al film with a thickness of 60 nm is deposited on the second high thermal conductivity layer 14 by sputtering, in that order, thereby forming the thermal conduction control layer 4.

Then, the protecting layer 5 made of an ultraviolet-curing resin with a thickness of 5 $\mu$m is formed on the thermal conduction control layer 4 by spin coat, thereby forming the optical disk 20, i.e., the magnetooptical disk.

At that time, a thermal conductivity of the SiN film forming the first low thermal conductivity layer 11 is 0.03J/(cm·sec·deg), and a thermal conductivity of the ZnS—SiO$_2$ film forming the second low thermal conductivity layer 13 is 0.007J/(cm·sec·deg) which is smaller than a thermal conductivity of 0.13J(cm·sec·deg) of the TbFeCo film forming the recording layer 3.

A thermal conductivity of the Al film forming the first and second high thermal conductivity layers 12, 14 is 2.3J/(cm·sec·deg) which is larger than that of the TbFeCo film forming the recording layer 3.

Inventive Example 2

Figure 2:
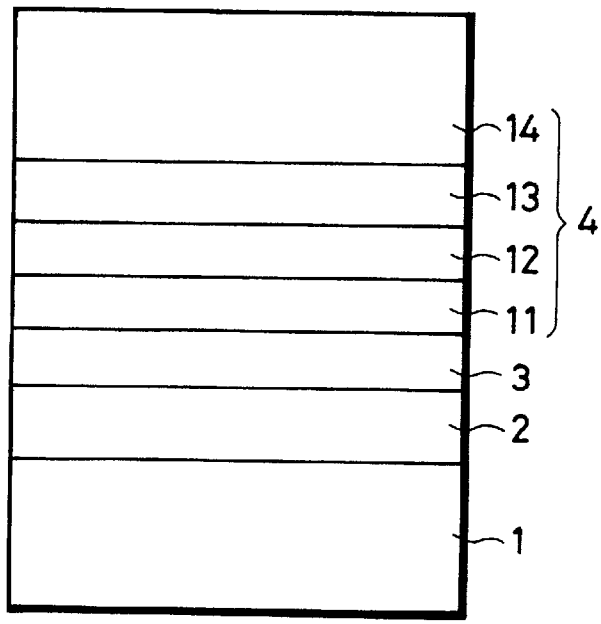
FIG. 2 is a schematic cross-sectional view showing an optical disk according to another embodiment of the present invention.

FIG. 2 is a schematic cross-sectional view illustrating an optical disk, i.e., magnetooptical disk according to another embodiment of the present invention.

An optical disk, which is generally depicted by reference numeral 30 in FIG. 2, has a transparent substrate 1 on which there are sequentially deposited a dielectric layer 2, a recording layer 3, a first low thermal conductivity layer 11, a first high thermal conductivity layer 12, a second low thermal conductivity layer 13 and a second high thermal conductivity layer 14. Then, the first low thermal conductivity layer 11, the first high thermal conductivity layer 12, the second low thermal conductivity layer 13 and the second high thermal conductivity layer 14 constitute a thermal conduction control layer 4.

As compared with the optical disk 20 shown in FIG. 1, the optical disk 30 has no protecting layer deposited thereon at the opposite side of the transparent substrate 1.

This optical disk 30 is produced as follows.

The dielectric layer 2 formed of SiN film with a thickness of 100 nm is deposited on the transparent substrate 1 made of a polycarbonate resin by sputtering, and the recording layer 3 formed of TbFeCo film with a thickness of 20 nm is deposited on the dielectric layer 2 by sputtering. The first low thermal conductivity layer 11 formed of SiN film with a thickness of 30 nm is deposited on the recording layer 3 by sputtering, the first high thermal conductivity layer 12 formed of Al film with a thickness of 20 nm is deposited on the first low thermal conductivity layer 11 by sputtering, the second low thermal conductivity layer 13 formed of SiN film with a thickness of 50 nm is deposited on the first high thermal conductivity layer 12 by sputtering and the second high thermal conductivity layer 14 formed of Al—Ti film is deposited on the second low thermal conductivity layer 13 by sputtering, in that order. Thus, these four layers constitute the thermal conduction control layer 4 and the optical disk 30 is formed.

At that time, a thermal conductivity of the SiN film forming the first low thermal conductivity layer 11 and the second thermal low thermal conductivity layer 13 is 0.03J (cm·sec·deg) which is smaller than a thermal conductivity of 0.13J/(cm·sec·deg) of the TbFeCo film forming the recording layer 3.

A thermal conductivity of the Al film forming the first high thermal conductivity layer 12 is 2.3J/(cm·sec·deg), and a thermal conductivity of the Al—Ti film forming the second high thermal conductivity layer 14 is 1.2J/(cm·sec·deg). These thermal conductivities are larger than that of the TbFeCo film forming the recording layer 3.

Comparative Example

Figure 3:
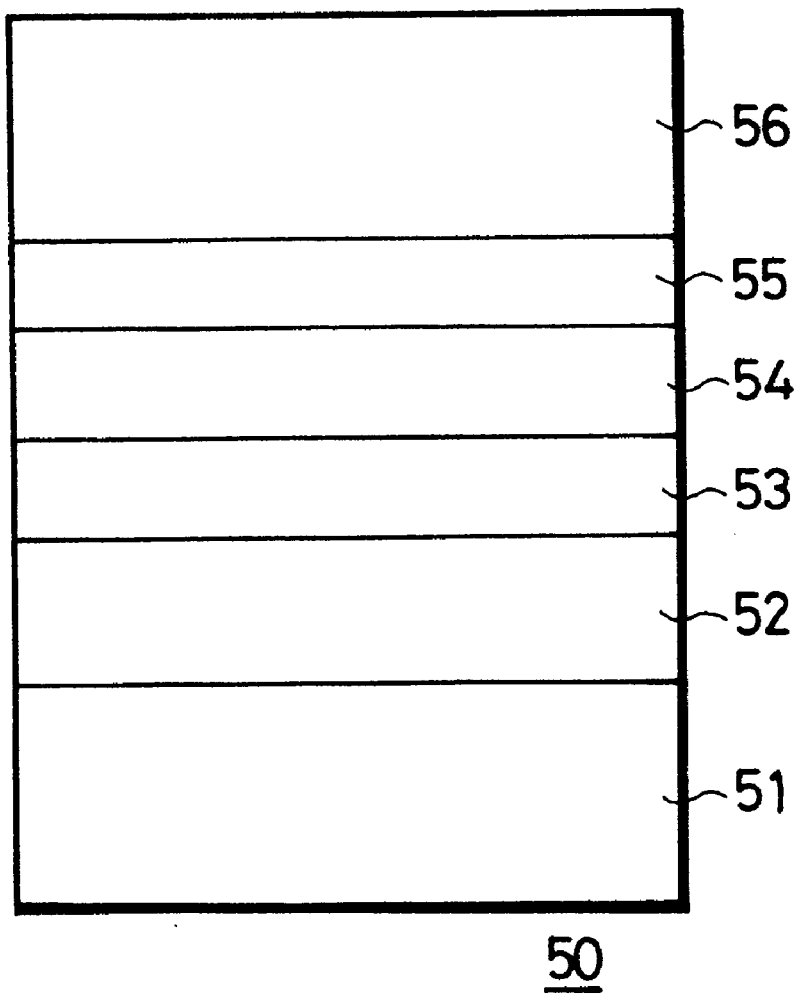
FIG. 3 is a schematic cross-sectional view of an optical disk according to a comparative example.

FIG. 3 is a schematic cross-sectional view illustrating a comparative example of an optical disk which is compared with the optical disk based on the magnetooptical disk according to the present invention.

An optical disk, which is generally depicted by reference numeral 50 in FIG. 3, has a transparent substrate 51 on which there are sequentially deposited a first dielectric layer 52, a recording layer 53, a second dielectric layer 54, a reflecting layer 55 and a protecting layer 56 made of an ultraviolet-curing resin.

This optical disk 50 is produced as follows.

As shown in FIG. 3, the first dielectric layer 52 formed of SiN film with a thickness of 100 nm is deposited on the transparent substrate 51 made of a polycarbonate resin or the like by sputtering, and the recording layer 53 formed of TbFeCo film with a thickness of 20 nm is deposited on the first dielectric layer 52 by sputtering. The second dielectric layer 54 formed of SiN film with a thickness of 30 nm is deposited on the recording layer 53 by sputtering, the reflecting layer 55 formed of Al film with a thickness of 50 nm is deposited on the second dielectric layer 54 by sputtering and the protecting layer 56 made of an ultraviolet-curing resin with a thickness of 10 μm is deposited on the reflecting layer 55 by spin coat, thereby the optical disk 50 being formed.

Power margins of these optical disks for recording power were measured. The recording conditions were such that a wavelength of recording laser beam was 680 nm, numerical aperture N.A. of optical system was 0.55, linear velocity was 6.4 m/sec and that a clock of one channel was 40 nsec. A random signal based on (1, 7) RLL recording system was recorded by light-emission of comb-shaped pulse. Information was recorded with recording powers being changed and bit error rates were measured.

Figure 4:
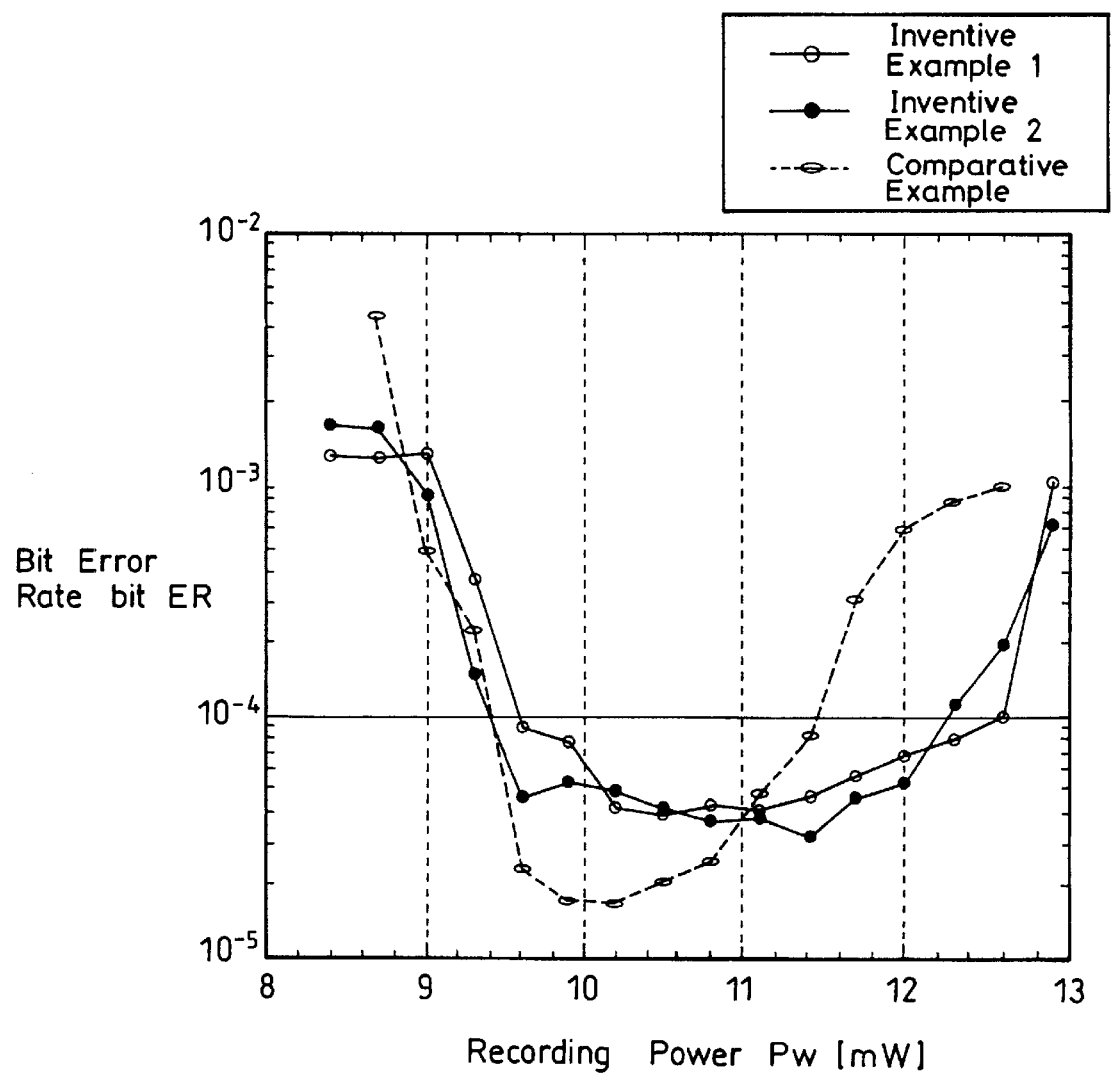
FIG. 4 is a graph showing a relationship between a recording power Pw (mW) and bit error rate bitER.

FIG. 4 shows measured results. FIG. 4 is a graph showing a relationship between recording power Pw (mW) and bit error rate bitER. A study of FIG. 4 reveals that a range of recording power Pw in which the bit error rate becomes less than $10^{-4}$ in the respective inventive examples became wider than that of the comparative example and the power margin was expanded.

It is considered that these measured results are based on a difference of heat characteristics in the recording layer. In order to examine heat characteristics more in detail, a manner in which a temperature is changed with time was examined.

Figure 5:
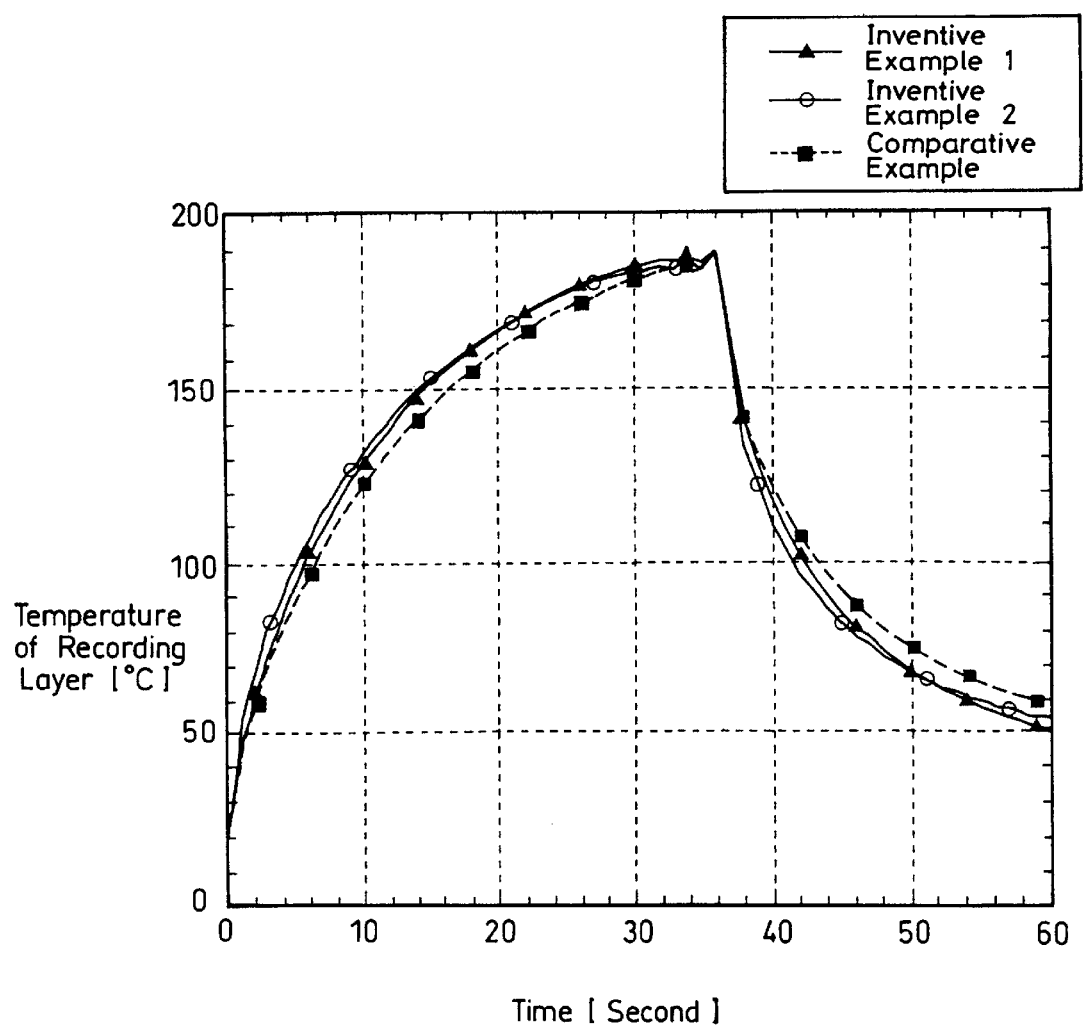
FIG. 5 is a graph showing a manner in which a temperature of a recording layer of an optical disk is changed with time.

In order to form unit recording pits of the same size, the recording layer was heated and cooled, and the manner in which temperatures of the recording layers of the optical disks in the inventive examples and the comparative example are changed with time was measured. FIG. 5 shows measured results. A study of FIG. 5 reveals that temperatures in the recording layers of the optical disks according to the inventive examples rise and fall quickly, i.e., the recording layers tend to be heated and cooled quickly as compared with the recording layer of the optical disk according to the comparative example.

Speeds at which the temperature of the recording layer rise and fall when information is recorded in actual practice are faster as compared with heating and cooling conditions in FIG. 5. Due to the conditions shown in FIG. 5, differences of temperature characteristics of the recording layers in the inventive examples and the comparative example become remarkable. Therefore, the thermal interference under high laser power can be suppressed.

With respect to the magnetooptical disks according to the inventive example 2 and the comparative example, amounts in which the disks are warped with time were measured.

The warp of 3.3-inch optical disks was measured under promoted aging condition at a temperature of 80° C. with a humidity of 85%. The warped amounts of optical disks were measured by measuring disk skew angles.

Figure 6:
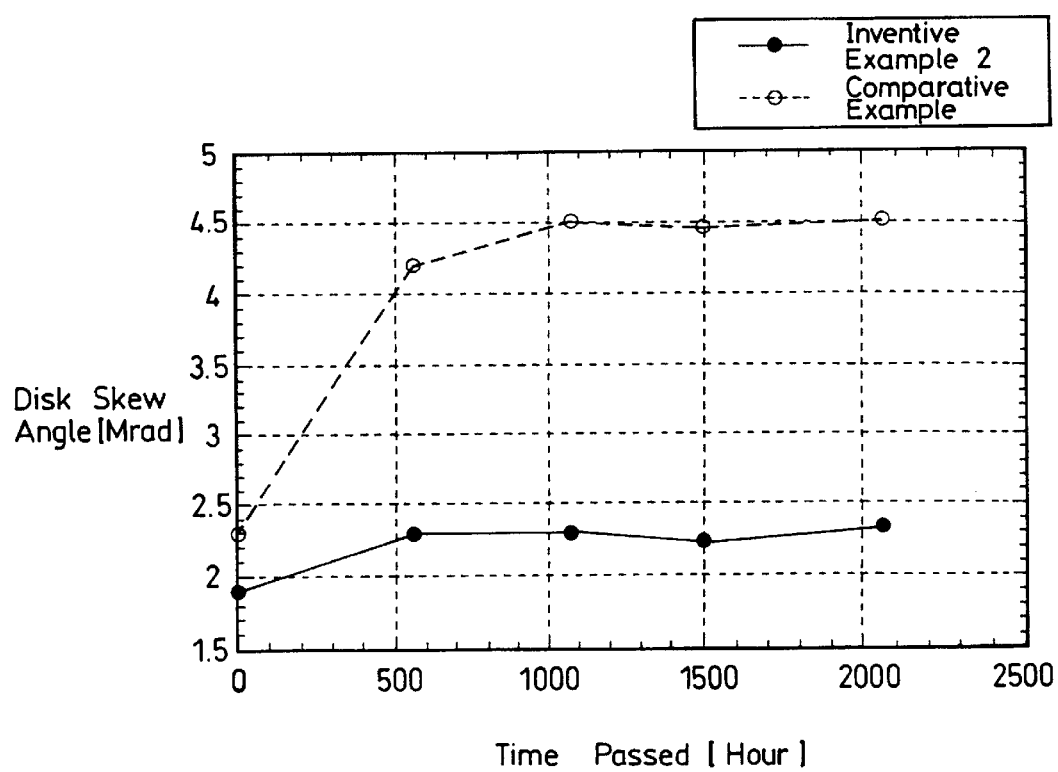
FIG. 6 is a graph showing a manner in which a warped amount of an optical disk is changed with time.

FIG. 6 shows measured results obtained when the disk skew angles were changed with time. A study of FIG. 6 shows that the optical disk according to the inventive example 2 has a small inclination angle, i.e., small warped amount of optical disk because the protecting layer made of an ultraviolet-curing resin is not formed on the optical disk according to the inventive example 2.

A method of manufacturing an optical disk according to the present invention, i.e., an example in which the three layers of the first high thermal conductivity layer, the second low thermal conductivity layer and the second high thermal conductivity layer in the thermal conduction control layer were formed by successive sputtering will be described.

Inventive Example 3

According to the inventive example 3, an optical disk based on a magnetooptical disk with a structure similar to that of the inventive example 1 shown in FIG. 1 is produced as follows.

A dielectric layer 2 formed of SiN film with a thickness of 80 nm was deposited on the transparent substrate 1 made of a polycarbonate resin by sputtering. A target material was silicon and sputtering conditions were such that a flow rate of argon gas was 85 sccm, a flow rate of nitrogen gas was 15 sccm, a gas pressure was 3 mtorr and an applied power was 1 kW.

Then, a recording layer 3 formed of TbFeCo film with a thickness of 20 nm was deposited on the dielectric layer 2 by sputtering. A target material was TbFeCo alloy, and sputtering conditions were such that a flow rate of argon gas was 80 sccm, a gas pressure was 3 mtorr and an applied power was 1.2 kW.

Subsequently, a first low thermal conductivity layer 11 formed of SiN film with a thickness of 30 nm was deposited on the recording layer 3 by sputtering. A target material was silicon, and sputtering conditions were such that a flow rate of argon gas was 85 sccm, a flow rate of nitrogen gas was 15 sccm, a gas pressure was 3 mtorr and an applied power was 1 kW.

Further, a first high thermal conductivity layer 12 formed of Al film was deposited on the first low thermal conductivity layer 11 by sputtering. A target material was Al, and sputtering conditions were such that a flow rate of argon gas was 80 sccm, a gas pressure was 2.5 mtorr and an applied power was 1 kW.

After a time period during which the thickness of the Al film becomes about 25 nm had been passed, in order to deposit the second low thermal conductivity layer 13, discharge was not stopped, and nitrogen gas was added to argon gas and flowed at a flow rate of 21 sccm. At that time, a gas pressure in the sputtering was 3 mtorr.

In this manner, the second low thermal conductivity layer 13 formed of AlN film was deposited. After a time period during which a thickness of the second low thermal conductivity layer 13 becomes about 50 nm had been passed, in order to deposit a second high thermal conductivity layer 14, discharge was not stopped, only the nitrogen gas was interrupted, and the second high thermal conductivity layer 14 formed of Al film with a thickness of 150 nm was deposited.

Specifically, in the inventive example 3, the three layers of the first high thermal conductivity layer 12, the second low thermal conductivity layer 13 and the second high thermal conductivity layer 14 were laminated by successive sputtering. Only when the second low thermal conductivity layer 13 was formed, nitrogen gas was flowed in addition to the argon gas.

Furthermore, a protecting layer made of an ultraviolet-curing resin with a thickness of 10 μm was formed on the second high thermal conductivity layer 14 by spin coat and thereby the optical disk 30 was formed.

At that time, a thermal conductivity of the SiN film forming the first low thermal conductivity film 11 was 0.03J/(cm·sec·deg) and a thermal conductivity of the AlN film forming the second low thermal conductivity layer 13 was 0.006J/(cm·sec·deg) which is smaller than a thermal conductivity of 0.13J/(cm·sec·deg) of the TbFeCo film forming the recording layer 3.

A thermal conductivity of the Al film forming the first and second high thermal conductivity layers 12 and 14 is 2.3J/(cm·sec·deg), and larger than that of the TbFeCo film forming the recording layer 3.

Incidentally, the Al target may be added with a material such as titanium so long as an added material does not change heat characteristics greatly.

Other method of manufacturing an optical disk according to the present invention, i.e., an example in which four layers for forming the thermal conduction control layer, i.e., the first low thermal conductivity layer, the first high thermal conductivity layer, the second low thermal conductivity layer and the second high thermal conductivity layer are deposited by successive sputtering will be described below.

Inventive Example 4

In the inventive example 4, an optical disk based on a magnetooptical disk with a structure similar to that of the inventive example 1 shown in FIG. 1 was manufactured as follows.

A dielectric layer 2 formed of AlN film with a thickness of 80 nm was deposited on a transparent substrate 1 made of a polycarbonate resin or the like by sputtering. A target material was Al, and sputtering conditions were such that a flow rate of argon gas was 80 sccm, a flow rate of nitrogen gas was 21 sccm, a gas pressure was 3 mtorr and an applied power was 1 kW.

Then, a recording layer 3 formed of TbFeCo film with a thickness of 20 nm was deposited on the dielectric layer 2 by sputtering. A target material was TbFeCo alloy, and sputtering conditions were such that a flow rate of argon gas was 80 sccm, a gas pressure was 3 mtorr and an applied power was 1.2 kW.

Subsequently, a first low thermal conductivity layer 11 formed of AlN film was deposited on the recording layer 3 by sputtering. A target material was Al, and sputtering conditions were such that a flow rate of argon gas was 80 sccm, a flow rate of nitrogen gas was 21 sccm, a gas pressure was 3 mtorr and an applied power was 1 kW.

After a time period during which the thickness of the AlN film becomes about 30 nm had been passed, in order to deposit a first high thermal conductivity layer 12, discharge was not stopped and only nitrogen gas was interrupted. At that time, a sputtering gas pressure was 2.5 mtorr.

In this manner, the first high thermal conductivity layer 12 formed of Al film was deposited. After a time period during which the thickness of the Al film becomes about 25 nm had been passed, in order to deposit a second low thermal conductivity layer 13, discharge was not stopped, nitrogen gas was flowed at a flow rate of 21 sccm in addition to the argon gas. At that time, a sputtering gas pressure was 3 mtorr.

As described above, the second low thermal conductivity layer 13 formed of AlN film was deposited. Then, after a time period during which the thickness of the AlN film becomes about 50 nm had been passed, in order to deposit a second high thermal conductivity layer 14, discharge was not stopped and only nitrogen gas was interrupted, whereafter the second high thermal conductivity layer 14 formed of the Al film with a thickness of 150 nm was deposited.

Specifically, in the inventive example 4, the four layers of the first low thermal conductivity layer 11, the first high thermal conductivity layer 12, the second low thermal conductivity layer 13 and the second high thermal conductivity layer 14 were deposited by successive sputtering. Only when the first and second low thermal conductivity layers 11 and 13 are deposited, nitrogen gas was flowed in addition to argon gas.

Furthermore, a protecting layer 5 made of an ultraviolet-curing resin with a thickness of 10 μm was deposited on the second high thermal conductivity layer 14 by spin coat, thereby forming the optical disk 20.

At that time, a thermal conductivity of the AlN film forming the first and second low thermal conductive layers 11, 13 is 0.006J/(cm·sec·deg) and smaller than a thermal conductivity of 0.13J/(cm·sec·deg) forming the recording layer 3 of the TbFeCo film forming the recording layer 3.

A thermal conductivity of the Al layer forming the first and second high thermal conductivity layers 12 and 14 is 2.3J/(cm·sec·deg) and larger than that of the TbFeCo film forming the recording layer 3.

Similarly to the inventive example 3, the Al target may be added with a material such as titanium so long as the material doe not change heat characteristics greatly.

Power margins of these optical disks according to the inventive examples 3, 4 and the comparative example for recording power were measured. The recording conditions were such that a wavelength of recording laser beam was 680 nm, a numerical aperture N.A. of optical system was 0.55, linear velocity was 6.4 m/sec and that a clock of one channel was 40 nsec. A random signal based on (1, 7) RLL recording system was recorded by light-emission of comb-shaped pulse. Information was recorded with recording powers being changed and bit error rates were measured.

Figure 7:
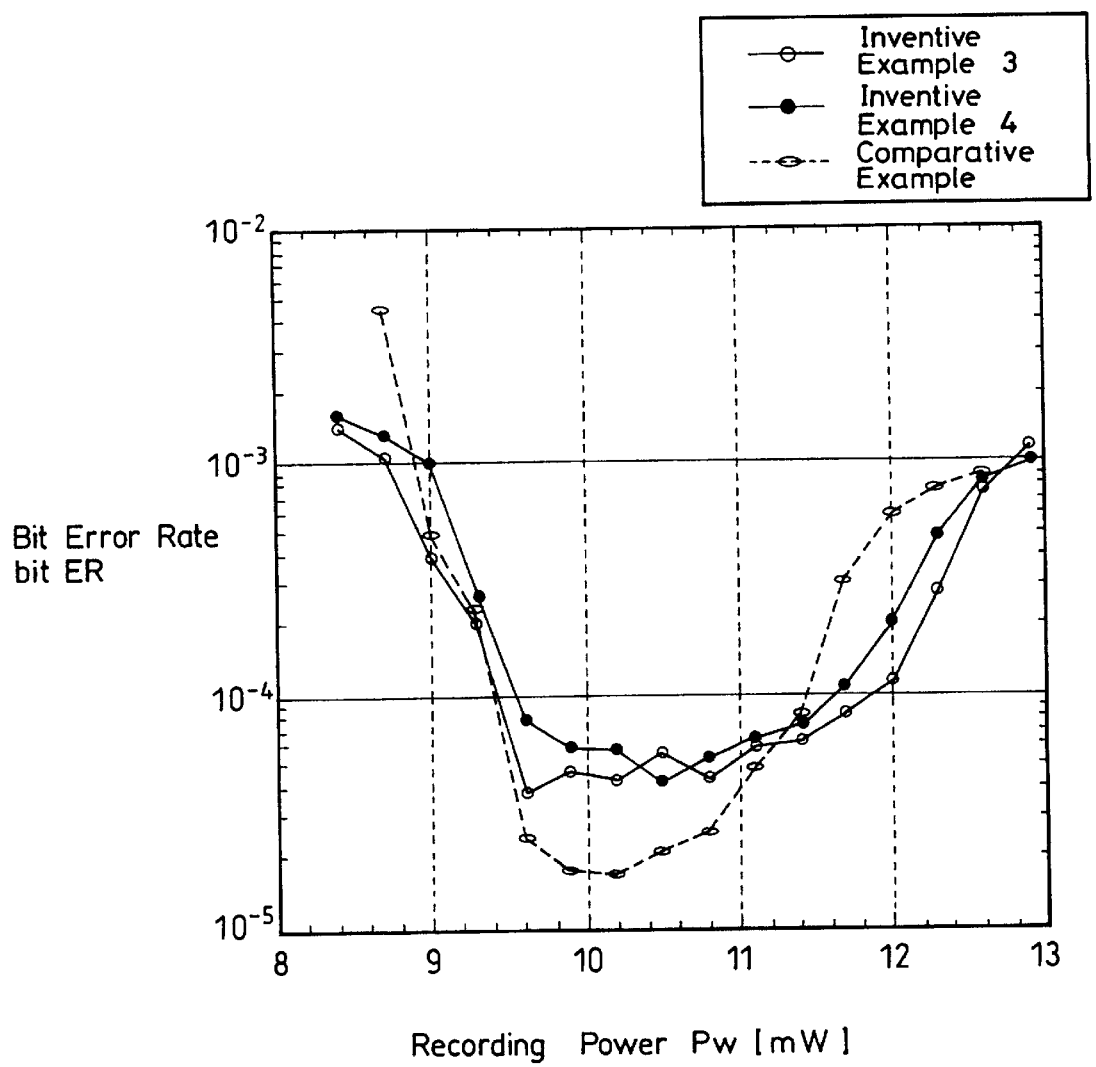
FIG. 7 is a graph showing a relationship between a recording power Pw (mW) and bit error rate bitER.

Measured results are shown in FIG. 7. FIG. 7 is a graph showing a relationship between a recording power Pw (mw) and a bit error rate bitER. A study of FIG. 4 reveals that a range of recording power Pw in which the error rate becomes less than $10^{-4}$ in the respective inventive examples became wider than that of the comparative example and the power margin was expanded.

As described above, it is possible to form an optical disk whose power margin is large as compared with the conventional optical disk.

As described above, if the manufacturing method according to the present invention is applied, then four layers of the first low thermal conductivity layer, the first high thermal conductivity layer, the second low thermal conductivity layer and the second high thermal conductivity layer are continuously deposited by use of the same target material while only the flow rate of gas is varied. Thus, the four layers can be continuously deposited within the same sputtering chamber. Therefore, the optical disk according to the present invention can be produced by the sputtering chambers of the same number as that of the conventional optical disk having four layers (structure having four layers deposited between the transparent substrate and the protecting layer).

While the recording layer is formed of a magnetic layer from which a magnetooptical signal can be obtained owning to a magnetooptical effect as described above so far, the optical disk and the manufacturing method according to the present invention can be applied to a so-called phase change-type optical disk in which the recording layer is formed of a layer such as a GeSbTe layer in which information can be recorded by the phase change generated with irradiation of laser beam.

The optical disk according to the present invention includes the recording layer and the thermal conduction control layer in which the first low thermal conductivity layer, the first high thermal conductivity layer, the second low thermal conductivity layer and the second high thermal conductivity layer are sequentially deposited. Therefore, even when the recording density is increased, the thermal interference can be suppressed and the margin of recording power can be expanded.

If the optical disk according to the present invention is such optical disk in which a thickness of a protecting layer made of an ultraviolet-curing resin is reduced or such protecting layer is not provided, then an amount in which the optical disk is warped due to the change of environmental conditions, in particular, the change of temperature can be decreased.

According to the manufacturing method of the present invention, of the thermal conduction control layer, the three layers of the first high thermal conductivity layer, the second low thermal conductivity layer and the second high thermal conductivity layer or the four layers of the first low thermal conductivity layer, the first high thermal conductivity layer, the second low thermal conductivity layer and the second high thermal conductivity layer are continuously deposited by the same target material while only the flow rate of gas is changed. Therefore, the three or four layers can be continuously deposited by the same sputtering chamber. Optical disks of multi-layer structure can be produced by the same apparatus as the apparatus for forming the conventional disk with four layers.

Specifically, there are required sputtering chambers of the number corresponding to the number of layers. When the optical disk having the six layers shown in FIG. 1 is produced, there are required six sputtering chambers. However, if the manufacturing method according to the present invention is applied, the optical disk can be manufactured by the three or four sputtering chambers. Therefore, the optical disk including six layers can be manufactured by the conventional deposition line having four sputtering chambers for forming the optical disk comprising four layers.

Having described preferred embodiments of the invention with reference to the accompanying drawings, it is to be understood that the invention is not limited to those precise embodiments and that various changes and modifications could be effected therein by one skilled in the art without departing from the spirit or scope of the invention as defined in the appended claims.

What is claimed is:

1. An optical disk comprising:
   a transparent substrate;
   a dielectric layer deposited on the transparent substrate, the dielectric layer is made of at least one material selected from the group consisting of: SiN; AlN;
   a recording layer deposited on the dielectric layer, the recording layer being of a type in which information can be rewritten by at least irradiation of a laser beam, the recording layer is made of at least one material selected from the group consisting of: TbFeCo; and GeSbTe; and
   a thermal conduction control layer deposited on the recording layer, the thermal control layer comprising:
   a first low thermal conductivity layer, the first low thermal conductivity layer is made of at least one material selected from the group consisting of: SiN; AlN; and ZnS—SiO$_2$;
   a first high thermal conductivity layer deposited on the first low thermal conductivity layer, the first high thermal conductivity layer is made of at least one material selected from the group consisting of: Al and Al—Ti; and
   a second low thermal conductivity layer deposited on the first high thermal conductivity layer, the second low thermal conductivity layer is made of at least one material selected from the group consisting of: SiN; AlN; and ZnS—$SiO_2$; and a second high thermal conductivity layer deposited on the second low thermal conductivity layer, the second high thermal conductivity layer is made of at least one material selected from the group consisting of: Al and Al—Ti.

2. The optical disk of claim 1 further comprising a protecting layer deposited on the thermal conduction layer.

3. The optical disk of claim 2 wherein the protecting layer is made of ultraviolet curing resin.

4. An optical disk as claimed in claim 1, wherein thermal conductivities of said first high thermal conductivity layer and said second high thermal conductivity layer are selected to be larger than that of said recording layer, and thermal conductivities of said first low thermal conductivity layer and said second low thermal conductivity layer are selected to be smaller than that of said recording layer.

* * * * *